(12) United States Patent
Huang (10) Patent No.: US 8,601,645 B2
(45) Date of Patent: Dec. 10, 2013

(54) STRAP-TENSIONING APPARATUS

(76) Inventor: Han-Ching Huang, Taichung (TW)

( * ) Notice: Subject to any disclaimer, the term of this patent is extended or adjusted under 35 U.S.C. 154(b) by 172 days.

(21) Appl. No.: 13/198,325

(22) Filed: Aug. 4, 2011

(65) Prior Publication Data

US 2013/0031755 A1 Feb. 7, 2013

(51) Int. Cl.
*B25B 25/00* (2006.01)
(52) U.S. Cl.
USPC ......... 24/68 CD; 24/68 D; 410/100; 254/218; 254/223; 254/237; 254/247
(58) Field of Classification Search
USPC ............ 24/70 ST, 68 CD, 68 D, 69 CT, 68 R; 410/100; 254/218, 223, 237, 247
See application file for complete search history.

(56) References Cited

U.S. PATENT DOCUMENTS

| | | | |
|---|---|---|---|
| 7,503,736 B1 * | 3/2009 | Chen | 410/100 |
| 7,789,603 B2 * | 9/2010 | Huck | 410/100 |
| 8,146,213 B2 * | 4/2012 | Lu | 24/68 CD |
| 8,312,601 B2 * | 11/2012 | Huang | 24/68 CD |
| 2003/0071251 A1 * | 4/2003 | Hu | 254/218 |
| 2008/0178439 A1 * | 7/2008 | Huang | 24/68 CD |
| 2009/0047091 A1 * | 2/2009 | Huck | 410/100 |
| 2010/0205790 A1 * | 8/2010 | Chen | 24/68 CD |
| 2010/0322737 A1 * | 12/2010 | Huang | 410/100 |
| 2011/0061213 A1 * | 3/2011 | Chang | 24/68 CD |
| 2011/0179609 A1 * | 7/2011 | Huang | 24/68 CD |
| 2012/0233823 A1 * | 9/2012 | Chou | 24/68 CD |
| 2013/0036580 A1 * | 2/2013 | Huang | 24/68 CD |

* cited by examiner

*Primary Examiner* — Robert J Sandy
*Assistant Examiner* — Michael Lee (57) ABSTRACT

A strap-tensioning apparatus includes a base including two walls each formed with a first arched edge and a second arched edge, a short strap connected to the base, a spring-loaded reel supported on the base, a long strap wound on the reel, a spring-loaded detent movably supported on the walls for engagement with the reel, a handle supported on the base, and a spring-loaded detent/suppressor is movably supported on the handle for engagement with the reel. The detent/suppressor suppresses the reel when it is retained in position on the first arched edges of the walls but allows the reel to spin when it is moved on the first arched edges of the walls in a direction.

8 Claims, 11 Drawing Sheets

FIG. 13 ated wheels 17 while the detent 23 rattles and slides on the ratcheted wheels 17 so that the long strap 20 is reeled in. As the handle 11 is pivoted counterclockwise, the detent 19 rattles and slides on the ratcheted wheels 17 while the detent 23 engages with and bosses 18 the ratcheted wheels 17 so that the long strap 20 is not reeled out.

STRAP-TENSIONING APPARATUS

BACKGROUND OF INVENTION

1. Field of Invention

The present invention relates to a strap-tensioning apparatus for tying down cargo on a vehicle and, more particularly, to a strap-tensioning apparatus capable of avoiding excessively fast withdrawal of a strap.

2. Related Prior Art

Figure 1:
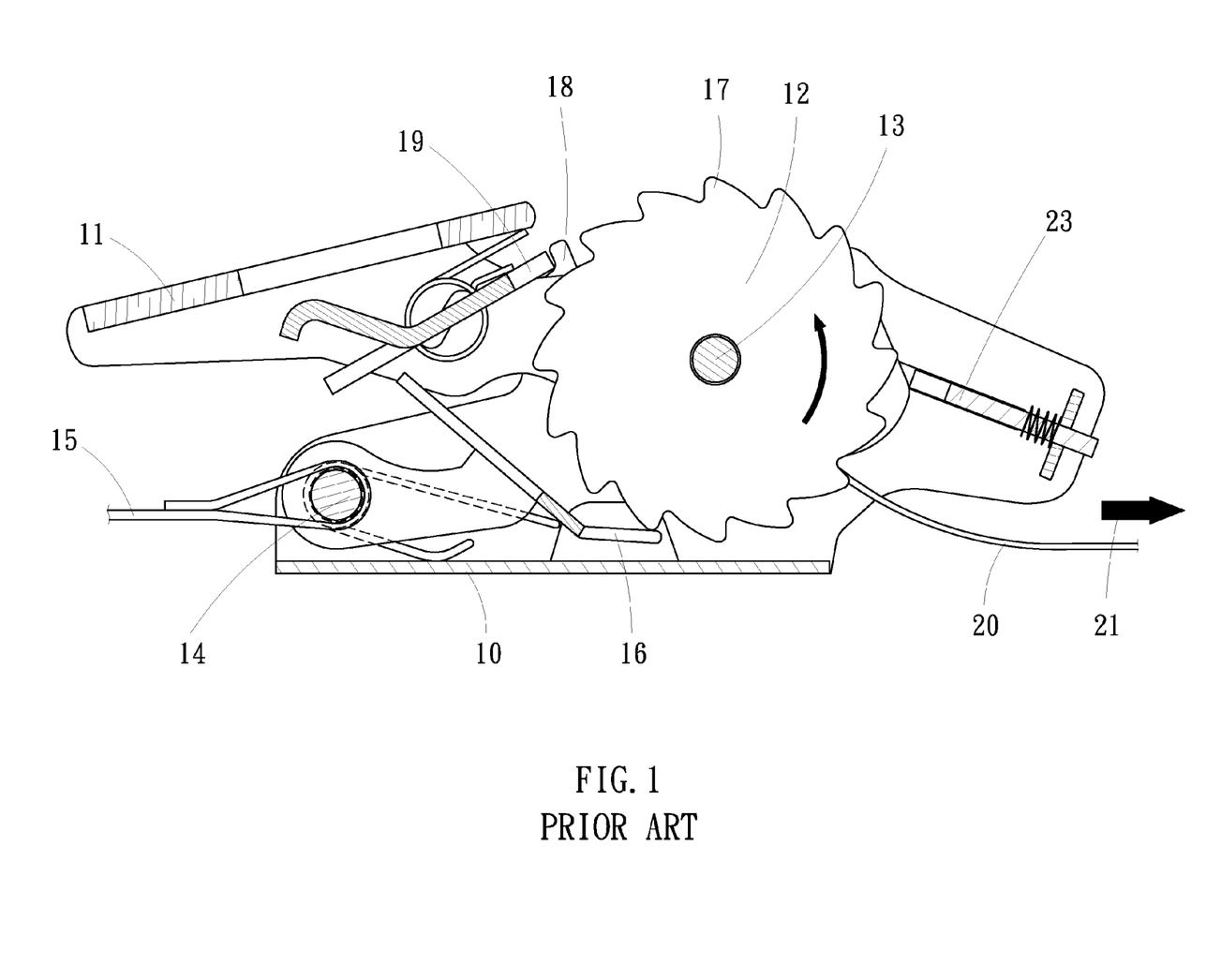
FIG. 1 is a cross-sectional view of a conventional strap-tensioning apparatus.
Figure 2:
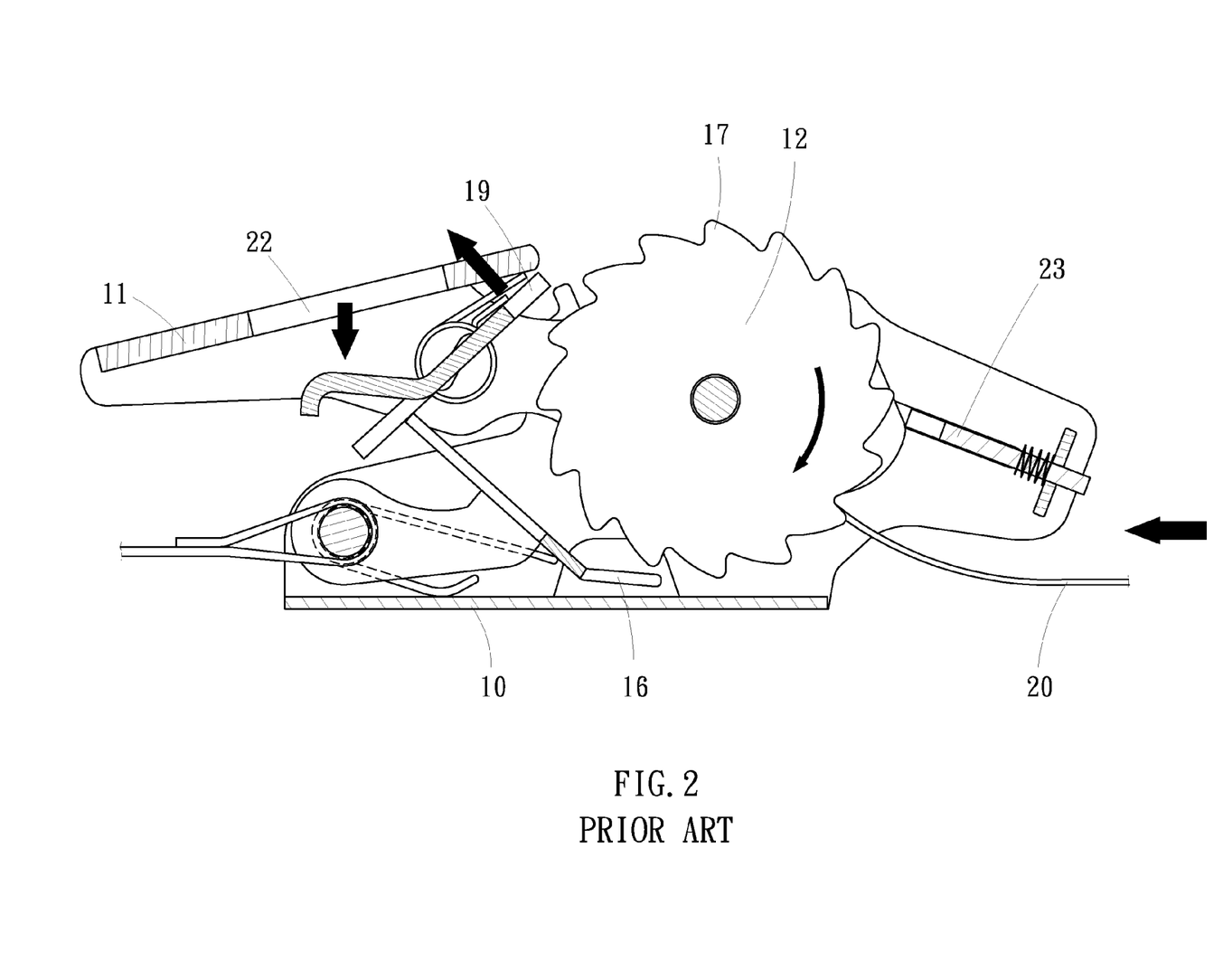
FIG. 2 is a cross-sectional view of the conventional strap-tensioning apparatus in another position than shown in FIG. 1.
Figure 3:
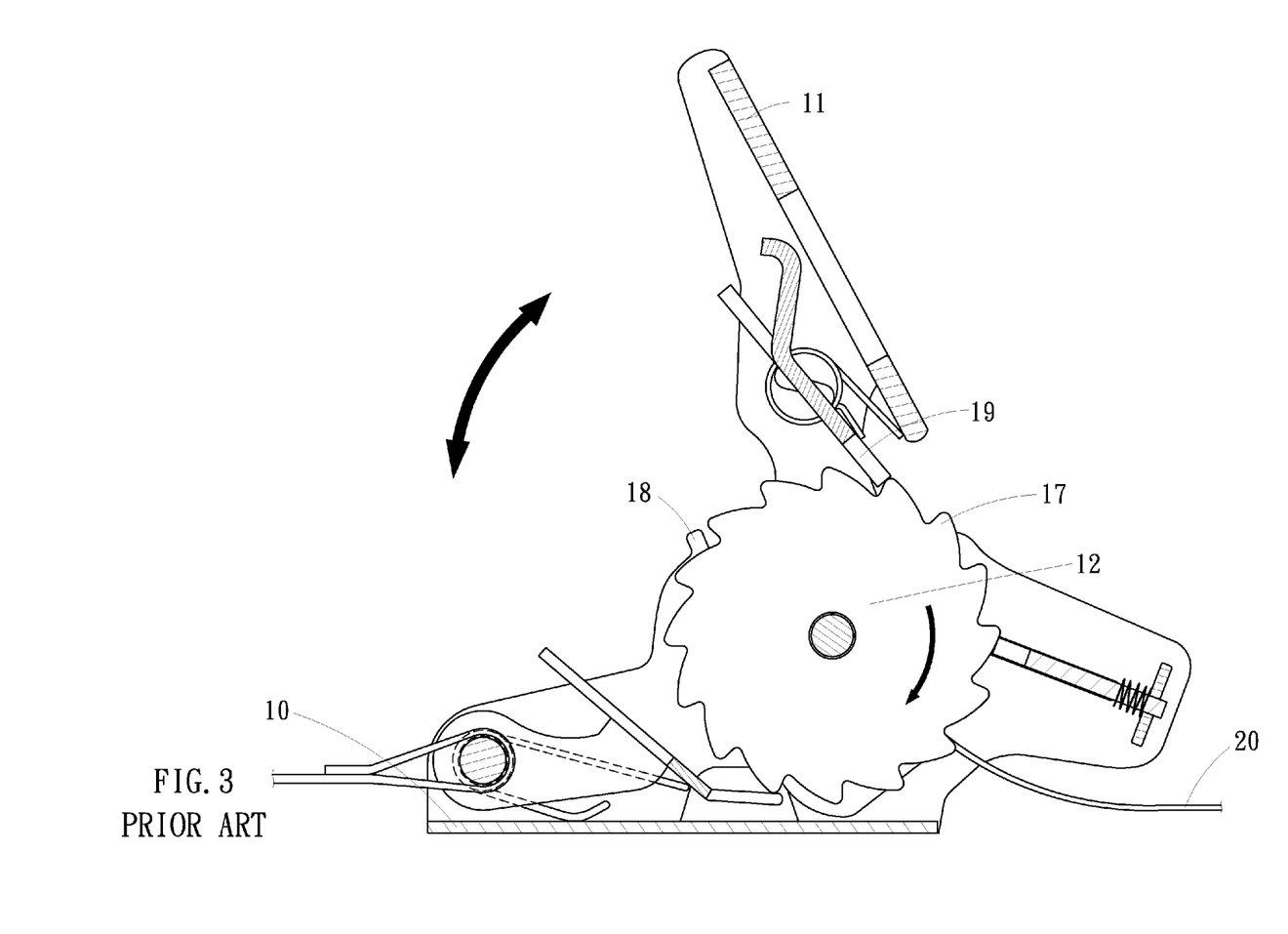
FIG. 3 is a cross-sectional view of the conventional strap-tensioning apparatus in another position than shown in FIG. 2.

Referring to FIGS. 1 through 3, a conventional strap-tensioning apparatus includes a base 10, a handle 11, a reel 12, an axle 13 for connecting the handle 11 and the reel 12 to the base 10, and a rod 14 secured to the base 10. A short strap 15 is tied to the rod 14. A long strap 20 is wound on the reel 12. The reel 12 is formed with two ratcheted wheels 17. A suppressor 16 is elastically supported on the base 10 and in elastic contact with the ratcheted wheels 17. The base 10 is formed with two bosses 18. The handle 11 includes an opening 22 defined therein and two cams formed thereon. A detent 19 is elastically connected to the handle 11 while another detent 23 is elastically supported on the base 10.

As shown in FIG. 1, the handle 11 is pivoted to a releasing position relative to the base 10. The detent 19 is kept away from the ratcheted wheels 17 of the reel 12 by the bosses 18. The detent 23 is kept away from the ratcheted wheels 17 of the reel 12 by the cams of the handle 11. The suppressor 16 is in elastic contact with the ratcheted wheels 17. The reeling in of the long strap 20 is avoided. However, the long strap 20 can be manually reeled out as indicated by an arrow head 21. During the reeling of the long strap 20, the ratcheted wheels 17 hit the suppressor 16 and make click sounds.

As shown in FIG. 2, the detent 19 is pressed down by a finger or a tool inserted through the opening 22. An end of the suppressor 16 is moved by the detent 19 while another end of the suppressor 16 is removed from the ratcheted wheels 17. Hence, the reel 12 is free for spinning. Accordingly, the long strap 20 can be reeled in as indicated by an arrow head.

As shown in FIG. 3, the handle 11 is manually pivoted to and fro to reel in the long strap 20. As the handle 11 is pivoted clockwise, the detent 19 engages with and spins the ratcheted wheels 17 while the detent 23 rattles and slides on the ratcheted wheels 17 so that the long strap 20 is reeled in. As the handle 11 is pivoted counterclockwise, the detent 19 rattles and slides on the ratcheted wheels 17 while the detent 23 engages with and bosses 18 the ratcheted wheels 17 so that the long strap 20 is not reeled out.

The long strap 20 can be automatically reeled in as shown in FIG. 2. The automatic reeling in of the long strap 20 could be excessively fast so that the long strap 20 could be turned into a whip that could hurt people. The situation could be worse since the free end of the long strap 20 is often connected to a hook that would cause more damages.

The present invention is therefore intended to obviate or at least alleviate the problems encountered in prior art.

SUMMARY OF INVENTION

It is the primary objective of the present invention to provide a strap-tensioning apparatus capable of avoiding excessively fast withdrawal of a strap.

To achieve the foregoing objective, the strap-tensioning apparatus includes a base, a spring-loaded reel, a spring-loaded detent, a handle and a spring-loaded detent/suppressor. The base includes two walls each formed with a first arched edge and a second arched edge. A short strap is tied to the base. The spring-loaded reel is supported on the base. The long strap is wound around the reel. The spring-loaded detent is movably supported on the walls for engagement with the reel. The handle is supported on the base. The handle includes two cams formed thereon and an opening defined therein. Each of the cams includes a lobe for pushing the spring-loaded detent from the reel. The spring-loaded detent/suppressor is movably supported on the handle for engagement with the reel. The handle can be pivoted to and fro to spin the reel to reel in the long strap when the detent/suppressor is supported on the second arched edges of the walls. The detent/suppressor suppresses the reel when it is retained in position on the first arched edges of the walls but allows the reel to spin when it is moved on the first arched edges of the walls from a first position to a second position. The detent/suppressor can be pushed via the opening and disengaged from the reel when it is located in the second position on the first arched edges of the walls.

Other objectives, advantages and features of the present invention will be apparent from the following description referring to the attached drawings.

BRIEF DESCRIPTION OF DRAWINGS

The present invention will be described through detailed illustration of two embodiments versus the prior art referring to the drawings wherein.

DETAILED DESCRIPTION OF EMBODIMENTS

Referring to FIGS. 4 through 12, there is shown a strap-tensioning apparatus 30 for tensioning a short strap 31 and a long strap 32 for fastening cargo on a vehicle in accordance with a first embodiment of the present invention. The strap-tensioning apparatus 30 includes a base 40, a handle 50 and a reel 60.

Figure 4:
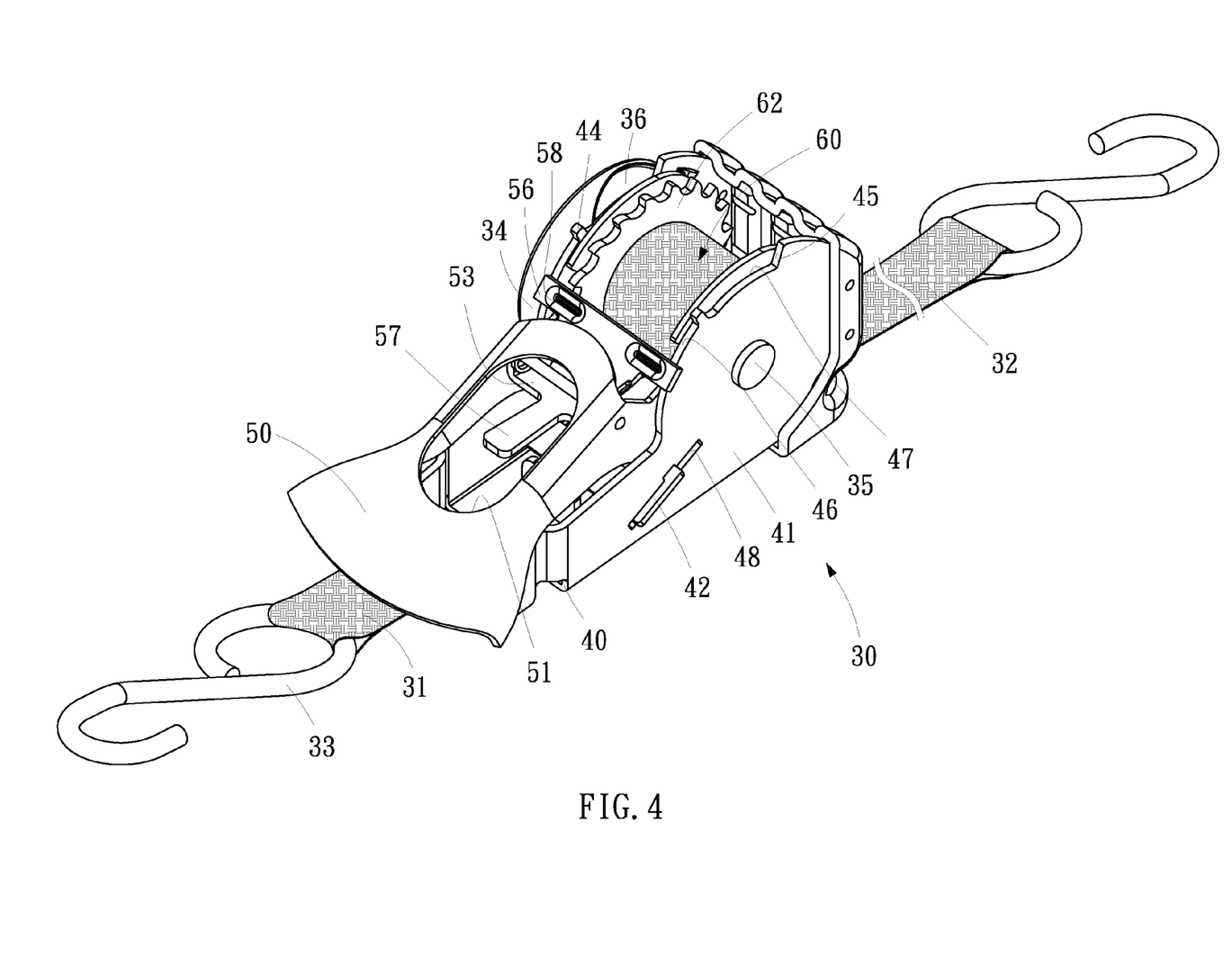
FIG. 4 is a perspective view of a strap-tensioning apparatus according to the first embodiment of the present invention.

The short strap 31 includes two loops each formed at an end. A hook 33 is tied to the first loop of the short strap 31. The long strap 32 includes two loops each formed at an end. Another hook 33 is tied to the first loop of the long strap 32.

The base 40 includes two parallel walls 41 extending thereon and a rod 43 extending between the walls 41. Each of the walls 41 includes a boss 44 formed thereon, a stop 45 formed thereon, a first arched edge 46 formed thereon between the boss 44 and the stop 45, a second arched edge 47 formed thereon near the boss 44, and a slot 48 defined therein. The arched edges 46 and 47 are concave in comparison with the boss 44 and the stop 45.

The strap-tensioning apparatus 30 further includes a detent 42 that is preferably loaded by a compression spring. The detent 42 includes two lateral portions each movably inserted in the slot 48 defined in a relative one of the walls 41.

The handle 50 includes two parallel cams 52 formed thereon and an opening 51 defined therein between the cams 52. Each of the cams 52 includes a lobe 54 formed thereon and a stop 55 formed thereon next to the lobe 54.

The strap-tensioning apparatus 30 further includes a detent/suppressor 53 that is preferably loaded by a torque spring. The detent/suppressor 53 is a T-shaped element formed with a head 56 that extends transversely and a tail 57 that extends longitudinally. The head 56 includes two lateral portions that extend beyond the tail 57. Each of the lateral portions of the head 56 is movably supported on a related one of the walls 41. The detent/suppressor 53 further includes two ribs 58 each extending from a related one of the lateral portions of the head 56. The detent/suppressor 53 is loaded by a torque spring preferably.

The reel 60 includes a tube 61 and two ratcheted wheels 62 formed on the tube 61. The tube 61 includes a slit defined therein. Each of the ratcheted wheels 62 includes an aperture 63 centrally defined therein and ratchets 64 formed thereon. Each of the ratchets 64 includes a radial edge 65 and an inclined edge 66.

In assembly, the ratcheted wheels 62 are located between the lobes 54 that are located between the walls 41. An end of the tube 61 is inserted through one of the lobes 54 and one of the walls 41. The second loop of the long strap 32 is inserted in the tube 61 through the slit. An axle 35 is inserted through the tube 61, the ratcheted wheels 62, the lobes 54, the walls 41 and the second loop of the long strap 32. Each end of the axle 35 is connected to a related ratcheted wheel 62 so that the axle 35 can only be spun together with the reel 60. The long strap 32 is tied to the axle 35. The tube 61 is rotationally supported on the walls 41. The rod 43 is inserted through the second loop of the short strap 31 so that the short strap 31 is tied to the rod 43. A coil spring 36 is located in a shell 34 attached to the wall 41. An end of the coil spring 36 is connected to the axle 35 and another end of the coil spring 36 is connected to the shell 34.

Figure 5:
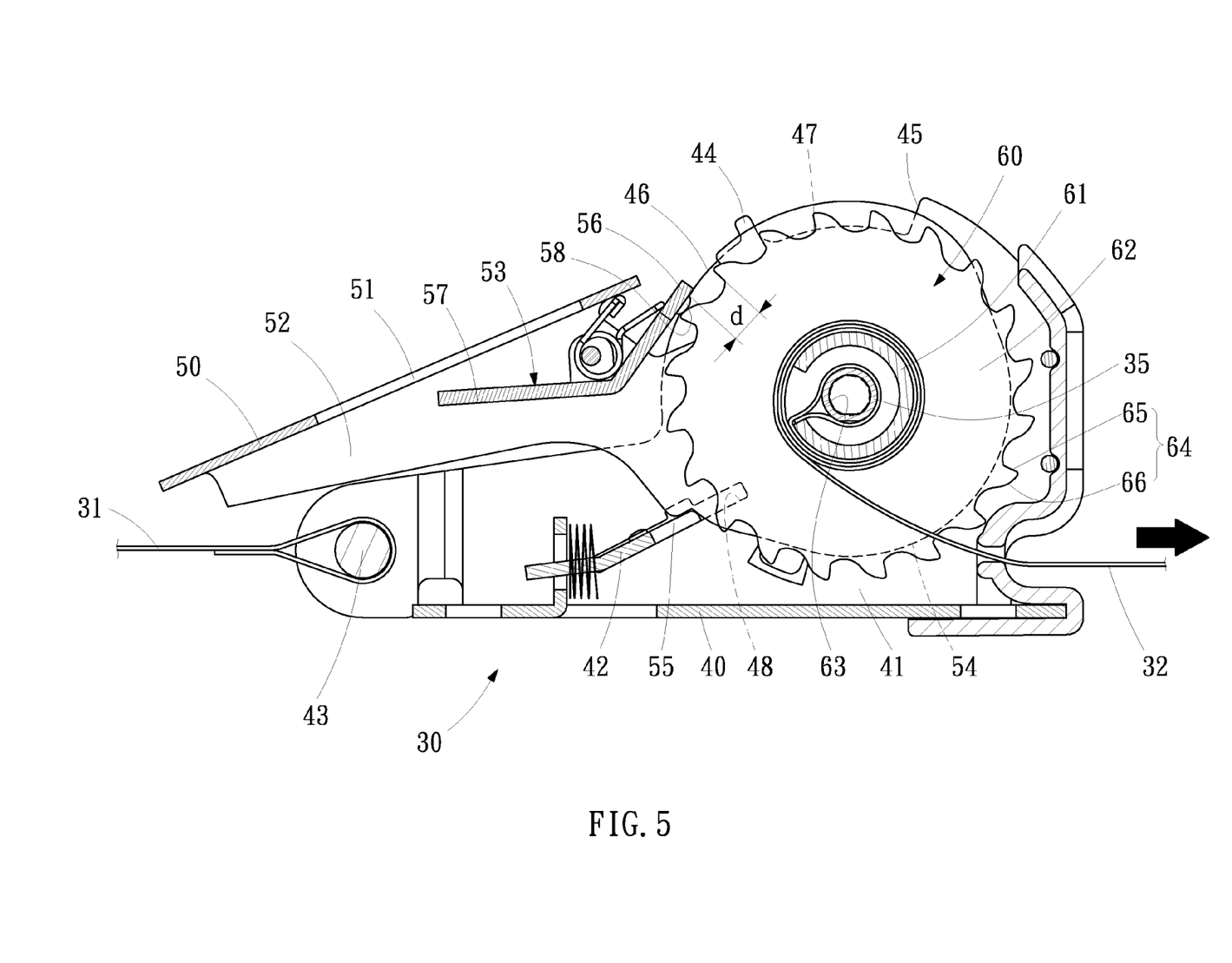
FIG. 5 is a cross-sectional view of the strap-tensioning apparatus shown in FIG. 4.

Referring to FIG. 5, the handle 50 is pivoted to a position where the lateral portions of the head 56 of the detent/suppressor 53 are located on the first arched edges 46 of the walls 41 of the base 40 while the head 56 is located away from the bosses 44. Each rib 58 is in elastic contact with the inclined edge 66 of a ratchet 64 of the related ratcheted wheel 62 as the coil spring 36 tends to cause the reel 60 to reel in the long strap 32. The detent 42 is kept away from the ratchets 64 by the lobes 54. As indicated by an arrow head, the long strap 32 can manually be reeled out as the radial edges 65 of the ratchets 64 can be moved past the ribs 58. Accordingly, the coil spring 36 is further loaded. The more the long strap 32 is reeled out, the more the coil spring 36 is loaded.

Figures 7, 8, 9:
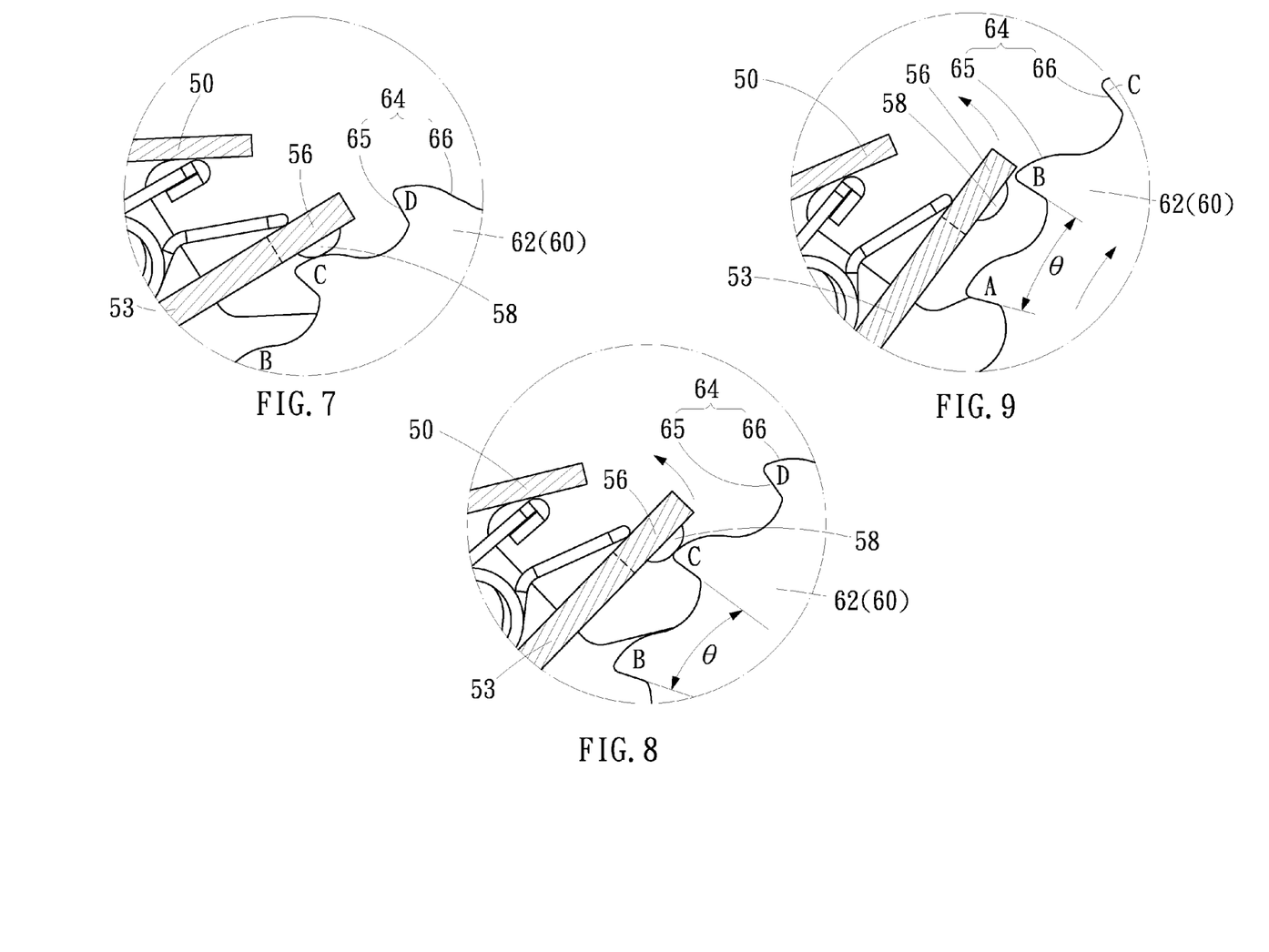
FIG. 7 is a partial, cross-sectional view of the strap-tensioning apparatus shown in FIG. 6.
FIG. 8 is a partial, cross-sectional view of the strap-tensioning apparatus in another position than shown in FIG. 7.
FIG. 9 is a partial, cross-sectional view of the strap-tensioning apparatus in another position than shown in FIG. 8.

If the long strap 32 is released accidentally, the coil spring 36 tends to reel in the long strap 32. In fact, the coil spring 36 can reel in the long strap 32 for a short distance d corresponding to an angle smaller than the angle θ between two adjacent ratchets 64 as shown in FIGS. 8 and 9. That is, the coil spring 36 can accelerate the ratcheted wheels 62 to a limited extent. The resultant angular momentum of the ratcheted wheels 62 however cannot overcome the resistance from the detent/suppressor 53. Therefore, the reeling in of the long strap 32 is stopped.

The manual reeling out of the long strap 32 has been described referring to FIG. 5. It should be noted that the long strap 32 could not be wound onto the reel 60 by the coil spring 36 automatically should the long strap 32 be released accidentally. Therefore, the long strap 32 would not hurt anybody or damage anything.

Figure 6:
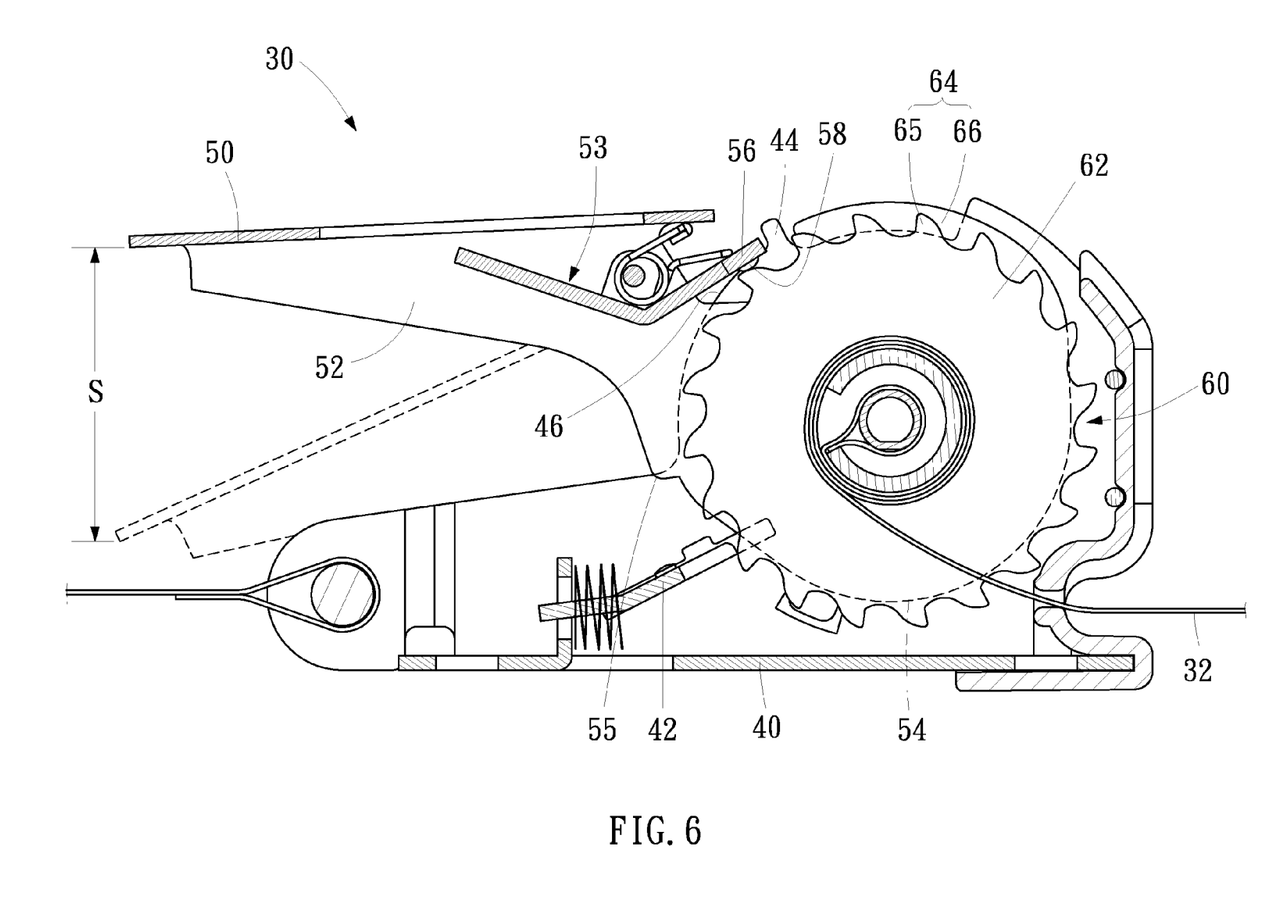
FIG. 6 is a cross-sectional view of the strap-tensioning apparatus in another position than shown in FIG. 5.

Referring to FIG. 6, the handle 50 is pivoted to a position where the lateral portions of the head 56 of the detent/suppressor 53 are located on the first arched edges 46 of the walls 41 of the base 40 while the head 56 is located against the bosses 44. Each rib 58 is in elastic contact with the inclined edge 66 of a ratchet 64 of a related ratcheted wheel 62. The detent 42 is in elastic contact with the inclined edge 66 of a ratchet 64 of each ratcheted wheel 62 as the coil spring 36 tends to cause the reel 60 to reel in the long strap 32. The long strap 32 is not supposed to be reeled out as the radial edges 65 of the ratchets 64 are abutted against the detents 42.

If the long strap 32 is released accidentally, the coil spring 36 tends to reel in the long strap 32. The force exerted by the coil spring 36 however cannot overcome the resistance from the detent/suppressor 53 plus the resistance from the detent 42. Therefore, the reeling in of the long strap 32 is avoided.

Referring to FIGS. 7 through 9, the winding of the long strap 32 onto the reel 60 by the coil spring 36 will be described. To this end, four ratchets 64 of a ratcheted wheel 62 are represented by "A", "B", "C" and "D."

Referring to FIG. 7, the related rib 58 is in elastic contact with the inclined edge 66 of the ratchet C as the handle 50 is located in the position shown in FIG. 6. The long strap 32 is retained still.

Referring to FIG. 8, the rib 58 is moved to the crown of the ratchet C along the inclined edge 66 of the ratchet C as the handle 50 is moved to a position between the positions shown in FIGS. 6 and 5. The rib 58 does not provide an adequate force to spin the ratcheted wheel 62 by the ratchet C although it is in contact with the ratchet C.

Referring to FIG. 9, the rib 58 is moved past the crown of the ratchet C as the handle 50 is moved to the position shown in FIG. 5. Now, all of the ratchets 64 are kept away from the detent 42. Hence, there is nothing to prevent the reel 60 from spinning and reeling in the long strap 32. The coil spring 36 makes the reel 60 reel in the long strap 32 for a distance corresponding to the angle θ between two adjacent ratchets 64 such as the ratchets C and B.

If the coil spring 36 is adequately loaded, it can accelerate the reel 60 by an adequate value so that the resultant angular momentum of the reel 60 is adequate to overcome the resistance from the detent/suppressor 53. Hence, the ratchet B moves past the rib 58 to allow the coil spring 36 to make the reel 60 reel in the long strap 32 for another distance corresponding to the angle θ. Synchronously, the energy loaded in the coil spring 36 is reduced.

If the coil spring 36 is still adequately loaded, it can accelerate the reel 60 by an adequate value so that the resultant angular momentum of the reel 60 is adequate to overcome the resistance from the detent/suppressor 53. Hence, the ratchet A moves past the rib 58 to allow the coil spring 36 to make the reel 60 reel in the long strap 32 for another distance corresponding to the angle θ. Synchronously, the energy loaded in the coil spring 36 is reduced.

The coil spring 36 continues to reel the long strap 32 onto the reel 60 until the energy left therein is too little to accelerate the reel 60 by an adequate value to give an adequate angular momentum to the reel 60 to overcome the resistance from the detent/suppressor 53. In that case, the coil spring 36 stops winding the long strap 32 onto the reel 60, and the hook 33 tied to the long strap 32 will not travel much further to hurt anyone or damage anything near the strap-tensioning apparatus 30. Accordingly, there is only a short final section of the long strap 32 left unwound on the reel 60. The final section of the long strap 32 can be manually wound onto the reel 60. Alternatively, the final section of the long strap 32 can be wound onto the reel 60 by the coil spring 36 as described referring to FIG. 10.

Figure 10:
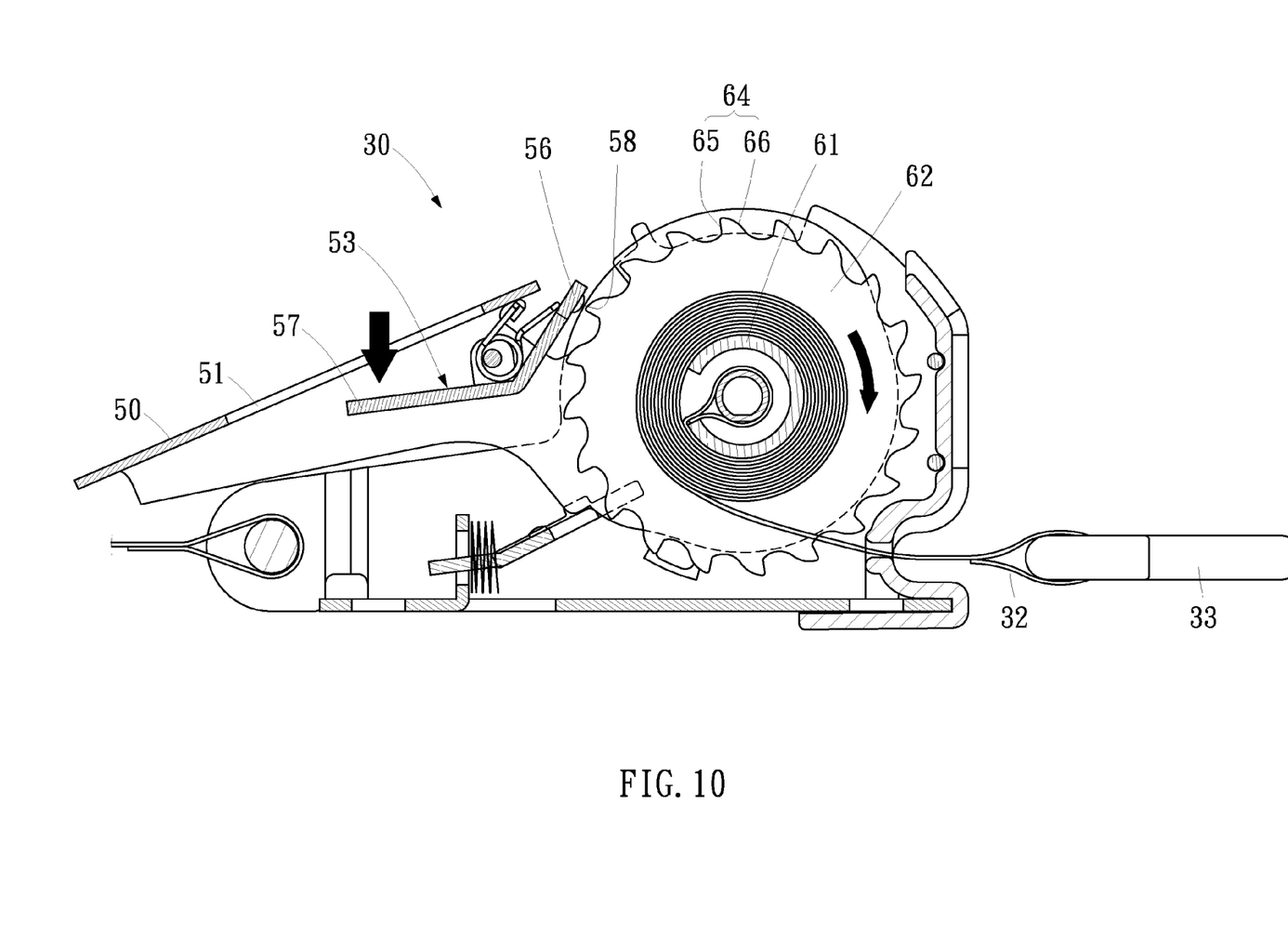
FIG. 10 is a cross-sectional view of the strap-tensioning apparatus in another position than shown in FIG. 9.

Referring to FIG. 10, the tail 57 of the detent/suppressor 53 is manually pressed through the opening 51 defined in the handle 50. The ribs 58 are removed from the ratchets 64 of the ratcheted wheels 62. Now, there is nothing to prevent the reel 60 from spinning and winding the final section of the long strap 32 onto the reel 60.

Access to the tail 57 is allowed by the opening 51. Thus, the tail 57 can be pushed so that the head 56 is lifted. Then, the head 56 can be moved over the bosses 44. Therefore, the head 56 can be moved from the first arched edges 46 of the walls 41 to the second arched edges 47, and vice versa. In other words, the handle 50 can be moved between the position shown in FIG. 6 and the position shown in FIG. 12.

Figure 11:
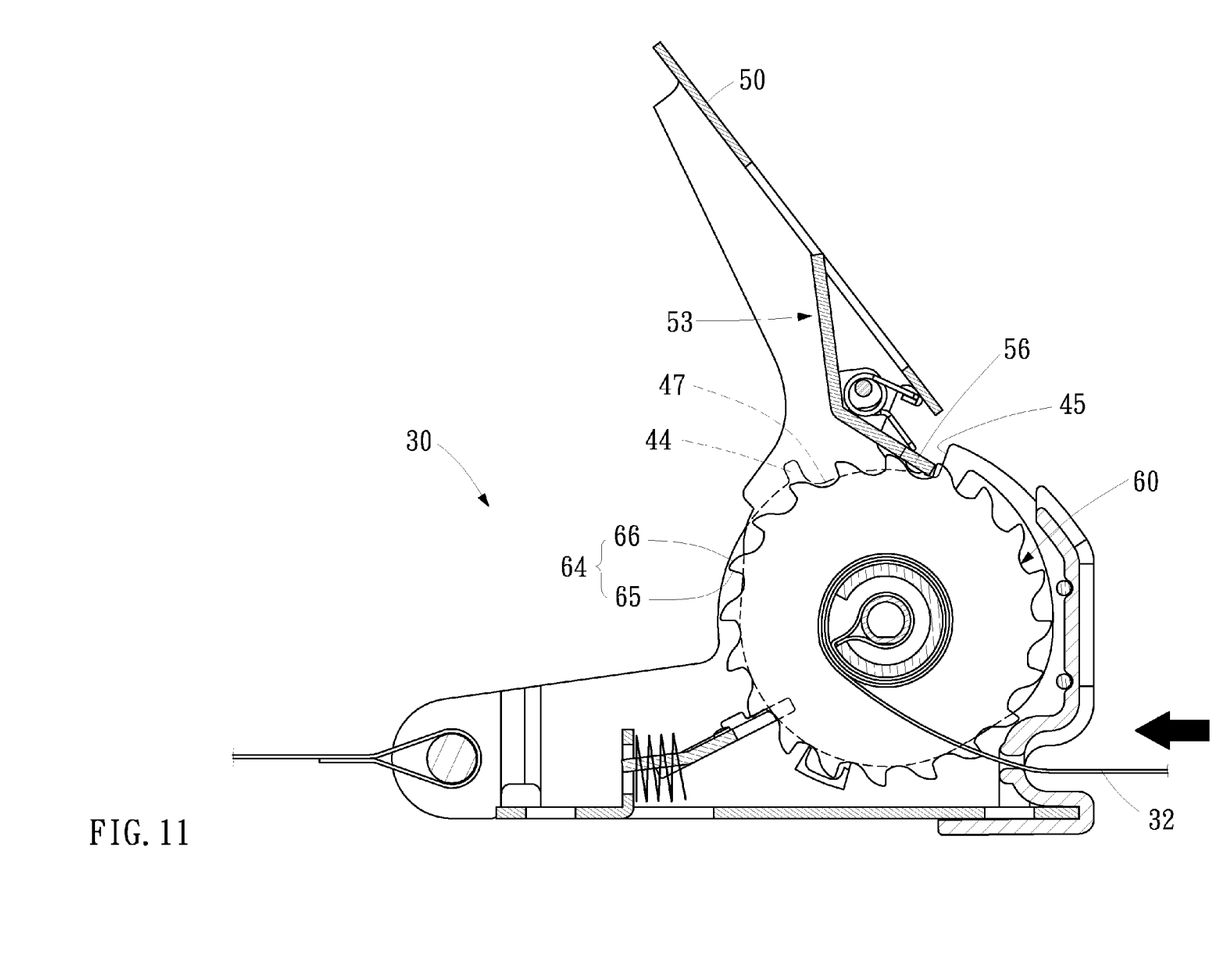
FIG. 11 is a cross-sectional view of the strap-tensioning apparatus in another position than shown in FIGS. 5 and 6.
Figure 12:
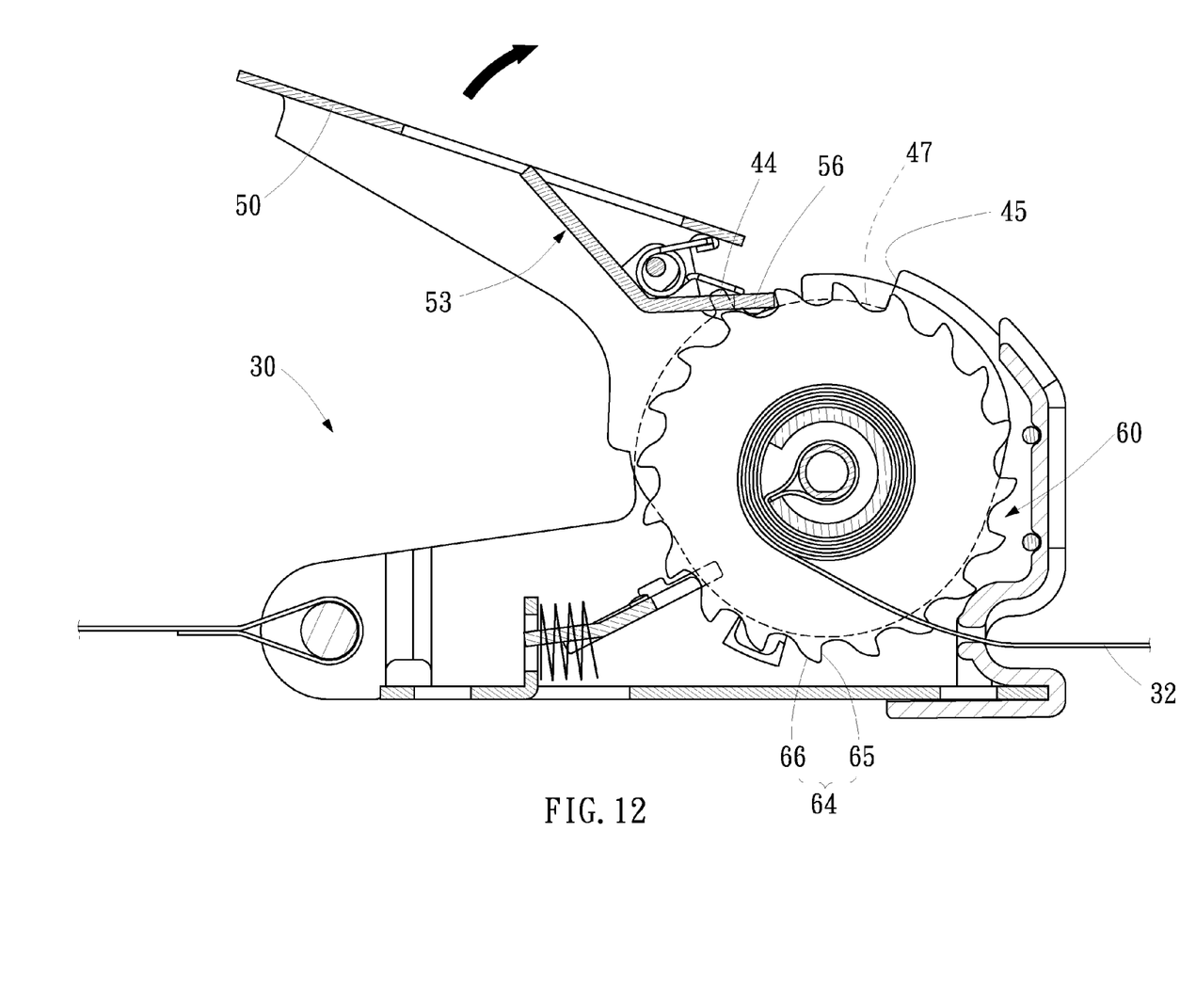
FIG. 12 is a cross-sectional view of the strap-tensioning apparatus in another position than shown in FIG. 11.

Referring to FIGS. 11 and 12, the handle 50 is in a manual reeling-in mode. The lateral portions of the head 56 of the detent/suppressor 53 are movably located on the second arched edges 47 of the walls 41. The detent/suppressor 53 and the detent 42 can alternately be engaged with the ratchets 64. Hence, handle 50 can be pivoted manually to and fro to reel the long strap 32 onto the reel 60.

Figures 13, 14, 15:
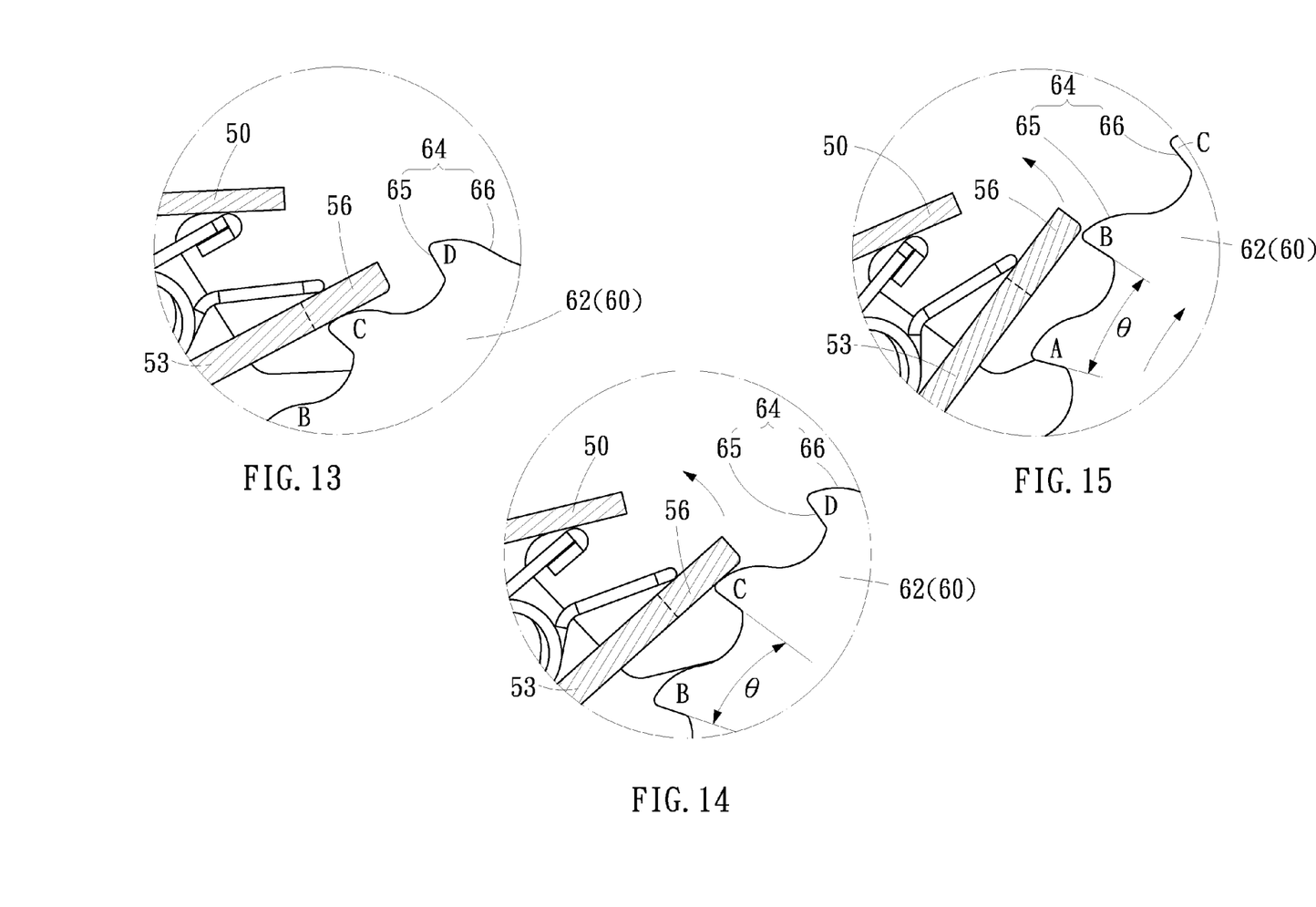
FIG. 13 is a partial, cross-sectional view of a strap-tensioning apparatus according to the second embodiment of the present invention.
FIG. 14 is a partial, cross-sectional view of the strap-tensioning apparatus in another position than shown in FIG. 13.
FIG. 15 is a partial, cross-sectional view of the strap-tensioning apparatus in another position than shown in FIG. 14.

Referring to FIGS. 13 to 15, there is shown a strap-tensioning apparatus according to a second embodiment of the present invention. The second embodiment is like the first embodiment except that the detent/suppressor 53 does not include the ribs 58.

The present invention has been described via the detailed illustration of two embodiments. Those skilled in the art can derive variations from the embodiments without departing from the scope of the present invention. Therefore, the embodiments shall not limit the scope of the present invention defined in the claims.

The invention claimed is:

1. A strap-tensioning apparatus including:
   a base including two walls each formed with a first arched edge and a second arched edge;
   a short strap connected to the base;
   a reel supported on the base;
   a long strap wound around the reel;
   a coil spring for causing the reel to reel in the long strap;
   a spring-loaded detent movably supported on the walls for engagement with the reel;
   a handle supported on the base, wherein the handle includes two cams formed thereon and an opening defined therein, wherein each of the cams includes a lobe for pushing the spring-loaded detent from the reel; and
   a spring-loaded detent/suppressor movably supported on the handle for engagement with the reel;
   wherein the handle can be pivoted to and fro to spin the reel to reel in the long strap when the detent/suppressor is supported on the second arched edges of the walls;
   wherein when the detent/suppressor is retained on the first arched edges of the walls, the detent/suppressor contacts the reel to suppress the spinning and winding of the reel;
   wherein when the handle is pivoted to and fro, the detent/suppressor is moved on the first arched edges of the walls from a first position wherein the spring-loaded detent elastically contacts the reel to a second position wherein the lobes of the cams push the spring-loaded detent from the reel to allow the reel to spin;
   wherein the detent/suppressor can be pushed via the opening and disengaged from the reel when the detent/suppressor is located in the second position on the first arched edges of the walls.

2. The strap-tensioning apparatus according to claim 1, wherein each of the walls includes a boss formed thereon between the first and second arched edges, wherein the detent/suppressor includes a head for engagement with the reel and a tail extending from the head, wherein the tail can be pushed through the opening so that the head can be lifted and moved over the bosses.

3. The strap-tensioning apparatus according to claim 2, wherein each of the walls includes a stop formed thereon so that the second arched edge is located between the stop and the boss.

4. The strap-tensioning apparatus according to claim 1, wherein the spring-loaded reel includes:
   two ratcheted wheels for engagement with the detent and the detent/suppressor; and
   a tube formed between the ratcheted wheels, wherein the long strap is wound on the tube.

5. The strap-tensioning apparatus according to claim 4, further including an axle supported on the base and inserted through the reel, wherein the long strap is inserted through the reel and tied to the axle.

6. The strap-tensioning apparatus according to claim 4, wherein the detent/suppressor includes:
   a head for engagement with the ratcheted wheels; and
   a tail extending from the head and accessible through the opening.

7. The strap-tensioning apparatus according to claim 6, wherein the detent/suppressor includes two ribs for engagement with the ratcheted wheels.

8. The strap-tensioning apparatus according to claim 1, wherein each of the cams includes a stop formed thereon next to the lobe so that the stop is in contact with a side of the detent when the lobe is in contact with an end of the detent.

* * * * *